United States Patent
Hashimoto et al.

(10) Patent No.: US 8,093,526 B2
(45) Date of Patent: Jan. 10, 2012

(54) WIRE ELECTRIC DISCHARGE MACHINE WITH IMPEDANCE SWITCHING

(75) Inventors: Takashi Hashimoto, Chiyoda-ku (JP); Yasuo Onodera, Chiyoda-ku (JP); Tatsushi Sato, Chiyoda-ku (JP); Koichiro Hattori, Chiyoda-ku (JP); Hisashi Yamada, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 421 days.

(21) Appl. No.: 12/374,956

(22) PCT Filed: Oct. 24, 2006

(86) PCT No.: PCT/JP2006/321178
§ 371 (c)(1),
(2), (4) Date: Jan. 23, 2009

(87) PCT Pub. No.: WO2008/050404
PCT Pub. Date: May 2, 2008

(65) Prior Publication Data
US 2009/0314747 A1    Dec. 24, 2009

(51) Int. Cl.
*B23H 7/04* (2006.01)
*B23H 1/02* (2006.01)
(52) U.S. Cl. .................. 219/69.12; 219/69.13
(58) Field of Classification Search ............... 219/69.12, 219/69.13, 69.18; 700/162
See application file for complete search history.

(56) References Cited

U.S. PATENT DOCUMENTS

| | | | | |
|---|---|---|---|---|
| 4,652,717 A | * | 3/1987 | Briffod et al. | 219/69.12 |
| 5,422,455 A | * | 6/1995 | Sato et al. | 219/69.13 |
| 6,069,335 A | * | 5/2000 | Kinbara | 219/69.13 |

FOREIGN PATENT DOCUMENTS

| | | | |
|---|---|---|---|
| JP | 61-236427 A | 10/1986 | |
| JP | 61-236433 A | 10/1986 | |
| JP | 62-208828 A | 9/1987 | |
| JP | 63-007225 A | 1/1988 | |
| JP | 63-180415 A | 7/1988 | |
| JP | 02-030429 A | 1/1990 | |
| JP | 03-036721 U | 4/1991 | |
| JP | 05-305520 A | 11/1993 | |

OTHER PUBLICATIONS

Office Action issued on May 24, 2011 in Japanese Patent Application No. 2008-540833.

* cited by examiner

*Primary Examiner* — Geoffrey S. Evans
*Assistant Examiner* — Thomas Ward
(74) *Attorney, Agent, or Firm* — Sughrue Mion, PLLC

(57) ABSTRACT

A wire electric discharge machine includes a wire electrode; a machining power supply that supplies a machining current to between the wire electrode and a workpiece. The machine further includes a first power feed contact and a second power feed contact that respectively feed power to the wire electrode; a first machining-current loop in which a first machining current flows from the first power feed contact toward the workpiece; a second machining-current loop in which a second machining current flow from the second power feed contact toward the workpiece; an impedance switching circuit that is provided in at least any one of the first machining-current loop and the second machining-current loop; and a control unit that controls a flow ratio of the first machining current and the second machining current by changing an impedance of the impedance switching circuit.

21 Claims, 7 Drawing Sheets

7A(7B)

7A(7B)

WIRE ELECTRIC DISCHARGE MACHINE WITH IMPEDANCE SWITCHING

TECHNICAL FIELD

The present invention relates to a wire electric discharge machine that generates an electric discharge between a wire electrode and a workpiece by application of a voltage therebetween thereby machining the workpiece.

BACKGROUND ART

A wire electric discharge machine is a machine that performs machining of a workpiece by use of an arc discharge between a wire electrode and the workpiece. In general, power feed contacts (feeding points) are respectively provided on the upper and lower sides of the workpiece (the wire electrode), and an electric current is supplied to the wire electrode via the power feed contacts. Machining currents flow from the upper and lower sides of the wire electrode simultaneously, so that two parallel circuits exist. Furthermore, a power supply is generally composed of a sub power supply circuit (a sub discharge power supply) for inducing a low-current spark discharge and a main power supply circuit (a main discharge power supply) for supplying a high current to be used as the machining current after the spark discharge is generated. Under rough machining conditions, the sub power supply induces a spark discharge, and the main power supply supplies a high current. On the other hand, under finish machining conditions, typically only the sub power supply is used for the machining. In other words, under the finish machining conditions, the sub power supply serves as the machining power supply.

In such a wire electric discharge machine, if machining currents, which are supposed to flow in parallel from the upper and lower sides of the wire electrode in a normal operating state, fail to flow from the both sides, i.e., the machining current from either one side does not flow due to some cause, the machining may become unstable because a high current is supplied from the other side. To cope with this problem, the following technology has been developed conventionally.

FIG. 8 is a schematic diagram of main elements of a conventional wire electric discharge machine, for example, disclosed in Patent document 1. In the wire electric discharge machine shown in FIG. 8, a machining current flowing from the upper side and a machining current flowing from the lower side are controlled by current-limiting resistors thereby achieving stable machining.

As shown in FIG. 8, an upper power feed contact 114 and a lower power feed contact 115 are respectively provided above and below a workpiece 112. First and second machining pulse power supplies 116 and 117 are provided with respect to the power feed contacts 114 and 115, respectively. The first machining pulse power supply 116 includes two switching transistors 119 and 120, a direct-current (DC) power supply 123, current-limiting resistors 121 and 122, and a pulse generator 118. Similarly, the second machining pulse power supply 117 includes two switching transistors 125 and 126, a DC power supply 129, current-limiting resistors 127 and 128, and a pulse generator 124. A single DC power supply can be shared by the first and second machining pulse power supplies 116 and 117 instead of the separate DC power supplies 123 and 129. Furthermore, a single pulse generator can be shared by the first and second machining pulse power supplies 116 and 117 instead of the separate pulse generators 118 and 124.

In a normal machining state, a current flowing through the upper power feed contact 114 and a current flowing through the lower power feed contact 115 are almost the same in magnitude. On the other hand, in an abnormal machining state, for example, where a current fed from either one side is suddenly stopped due to the effect of vibrations of the wire electrode or the like, a current fed from the other side increases, whereby the wire electrode tends to be easily broken. However, even in the state like this, in the wire electric discharge machine disclosed in Patent document 1, because the machining current flowing through the upper power feed contact 114 (or the lower power feed contact 115) is controlled by the current-limiting resistors 121 and 122 (or the current-limiting resistors 127 and 128), it is possible to prevent a flow of a high current from only one side. Thus, it is possible to prevent the wire electrode from being broken.

Patent document 1: Japanese Patent Application Laid-open No. S61-236427

DISCLOSURE OF INVENTION

Problem to be Solved by the Invention

It can be considered that the shape of the workpiece after the machining depends on the machining current. An amount of machining increases when a high machining current is used, conversely, an amount of machining decreases when a low machining current is used. Therefore, an absolute dimension is decreased in an area to which a high machining current is applied, and increased in an area to which a low machining current is applied. This is a physical phenomenon that is true not only in the X-Y direction (also referred to as a plane direction or a horizontal direction) but also in the Z-direction (also referred to as a wire direction, a through-thickness direction, or a vertical direction).

In the circuit configuration disclosed in Patent document 1, in a stable machining state, a machining current flowing from the upper side of a wire electrode (an upper machining current) and a machining current flowing from the lower side of the wire electrode (a lower machining current) are determined by the current-limiting resistors 121, 122, 127, and 128 and the DC power supplies 123 and 129. In other words, a machining shape in the through-thickness direction depends on the ratio of the fixed upper machining current and the fixed lower machining current.

Or, in a case where one power supply circuit is connected to both an upper power feed contact and a lower power feed contact, the flow ratio of an upper machining current and a lower machining current is determined based on floating impedances of a wiring and a mechanical system, and a workpiece is formed into a machining shape depending on the flow ratio.

In this manner, in the wire electric discharge machine, a machining shape depends on a flow ratio of upper and lower machining currents. However, in the conventional wire electric discharge machine, the flow ratio was a fixed value determined depending on a configuration of the machine, so that it was difficult to machine a workpiece into a desired machining shape. Especially, it was particularly difficult to machine a workpiece into a stepped shape than machining the workpiece into a simple flat shape. When the workpiece is machined into a stepped shape, because a wire electrode 102 acts as a conductor with an impedance, the impedance increases under such a condition that a wire guide is positioned above the height of the workpiece, i.e., this is also one of the reasons why the impedance increases, and leads to a decrease in the upper machining current. Namely, when the workpiece is machined into a stepped shape, the flow ratio of the upper machining current and the lower machining current significantly varies depending on the machining position (the step). This may lead to a situation that the machining shape in the through-thickness direction is irregular (cannot be controlled).

The present invention has been made to solve the above problems. An object of the present invention is to obtain an arbitrary machining shape in the through-thickness direction by controlling a flow ratio of a first machining current flowing from a first power feed contact toward the workpiece and a second machining current flowing from a second power feed contact toward the workpiece in a configuration in which the first power feed contact and the second power feed contact are provided across the workpiece.

Means for Solving Problem

To solve the above problems, a first wire electric discharge machine according to the present invention, which generates an electric discharge between a wire electrode and a workpiece by application of a voltage thereby machining the workpiece, includes a wire electrode that is capable of moving; a machining power supply that supplies a machining current to between the wire electrode and a workpiece; a first power feed contact and a second power feed contact that respectively feed power by having contact with the wire electrode at least two points opposed to each other across the workpiece; a first machining-current loop that includes the machining power supply, the first power feed contact, the wire electrode, and the workpiece, and lets a first machining current to flow from the first power feed contact toward the workpiece; a second machining-current loop that includes the machining power supply, the second power feed contact, the wire electrode, and the workpiece, and lets a second machining current to flow from the second power feed contact toward the workpiece; an impedance switching circuit that is provided in at least any one of the first machining-current loop and the second machining-current loop, the impedance switching circuit having a variable impedance; and a control unit that controls a flow ratio of the first machining current and the second machining current by changing the impedance of the impedance switching circuit.

Furthermore, in a second wire electric discharge machine according to the present invention, in the first wire electric discharge machine, a first impedance switching circuit is provided between the first power feed contact and the machining power supply in the first machining-current loop, a second impedance switching circuit is provided between the second power feed contact and the machining power supply in the second machining-current loop, and the control unit controls the flow ratio of the first machining current and the second working current by changing impedances of the first impedance switching circuit and the second impedance switching circuit.

Moreover, a third wire electric discharge machine according to the present invention, which generates an electric discharge between a wire electrode and a workpiece by application of a voltage thereby machining the workpiece, includes a wire electrode that runs is capable of moving; a first machining power supply and a second machining power supply that respectively supply a machining current to between the wire electrode and a workpiece; a first power feed contact and a second power feed contact that respectively feed power by having contact with the wire electrode at least two points opposed to each other across the workpiece; a first machining-current loop that includes the first machining power supply, the first power feed contact, the wire electrode, and the workpiece, and lets a first machining current to flow from the first power feed contact toward the workpiece; a second machining-current loop that includes the first machining power supply, the second power feed contact, the wire electrode, and the workpiece, and lets a second machining current to flow from the second power feed contact toward the workpiece; a third machining-current loop that includes the second machining power supply, the first power feed contact, the wire electrode, and the workpiece, and lets a third machining current to flow from the first power feed contact toward the workpiece; a fourth machining-current loop that includes the second machining power supply, the second power feed contact, the wire electrode, and the workpiece, and lets a fourth machining current to flow from the second power feed contact toward the workpiece; an impedance switching circuit that is provided in at least any one of the first machining-current loop and the second machining-current loop and at least any one of the third machining-current loop and the fourth machining-current loop so as to be shared among at least two machining-current loops, the impedance switching circuit having a variable impedance; and a control unit that controls a flow ratio of the first machining current and the second machining current and a flow ratio of the third machining current and the fourth machining current by changing the impedance of the impedance switching circuit.

EFFECT OF THE INVENTION

A wire electric discharge machine according a first aspect of the present invention controls a flow ratio of a first machining current flowing from a first power feed contact toward a workpiece and a second machining current flowing from a second power feed contact toward the workpiece. Therefore, it is possible to obtain an arbitrary machining shape in a through-thickness direction.

A wire electric discharge machine according a second aspect of the present invention controls a flow ratio of a first machining current and a second machining current by changing impedances of a first impedance switching circuit and a second impedance switching circuit. Therefore, it is easy to control the flow ratio.

In a wire electric discharge machine according a third aspect of the present invention an impedance switching circuit is shared by at least any one of a first machining-current loop and a second machining-current loop and at least any one of a third machining-current loop and a fourth machining-current loop. Therefore, the number of components can be reduced, so that it is possible to reduce a cost.

BRIEF DESCRIPTION OF DRAWINGS

FIGS. 3-1 is a diagram for explaining a concrete configuration of an impedance switching circuit that employs reactors.

FIGS. 3-2 is a diagram for explaining a concrete configuration of an impedance switching circuit that employs resistor elements.

EXPLANATIONS OF LETTERS OR NUMERALS 1 wire electrode
2 workpiece
3A upper power feed contact (first power feed contact)
3B lower power feed contact (second power feed contact)
4 wire guide
5 main discharge power supply (main machining power supply)
5A main discharge power supply (main machining power supply/first machining power supply)
5B main discharge power supply (main machining power supply/second machining power supply)
6 sub discharge power supply (sub machining power supply)
7A first impedance switching circuit
7B second impedance switching circuit
8 terminal block
9 lower feeder line
10 upper feeder line
11 upper sub feeder line
12 lower sub feeder line
13 control means (control unit)
A power supply box

BEST MODE(S) FOR CARRYING OUT THE INVENTION

Exemplary embodiments of a wire electric discharge machine according to the present invention are explained in detail below with reference to the accompanying drawings. Incidentally, the invention is not limited to the embodiments.

First Embodiment

Figure 1:
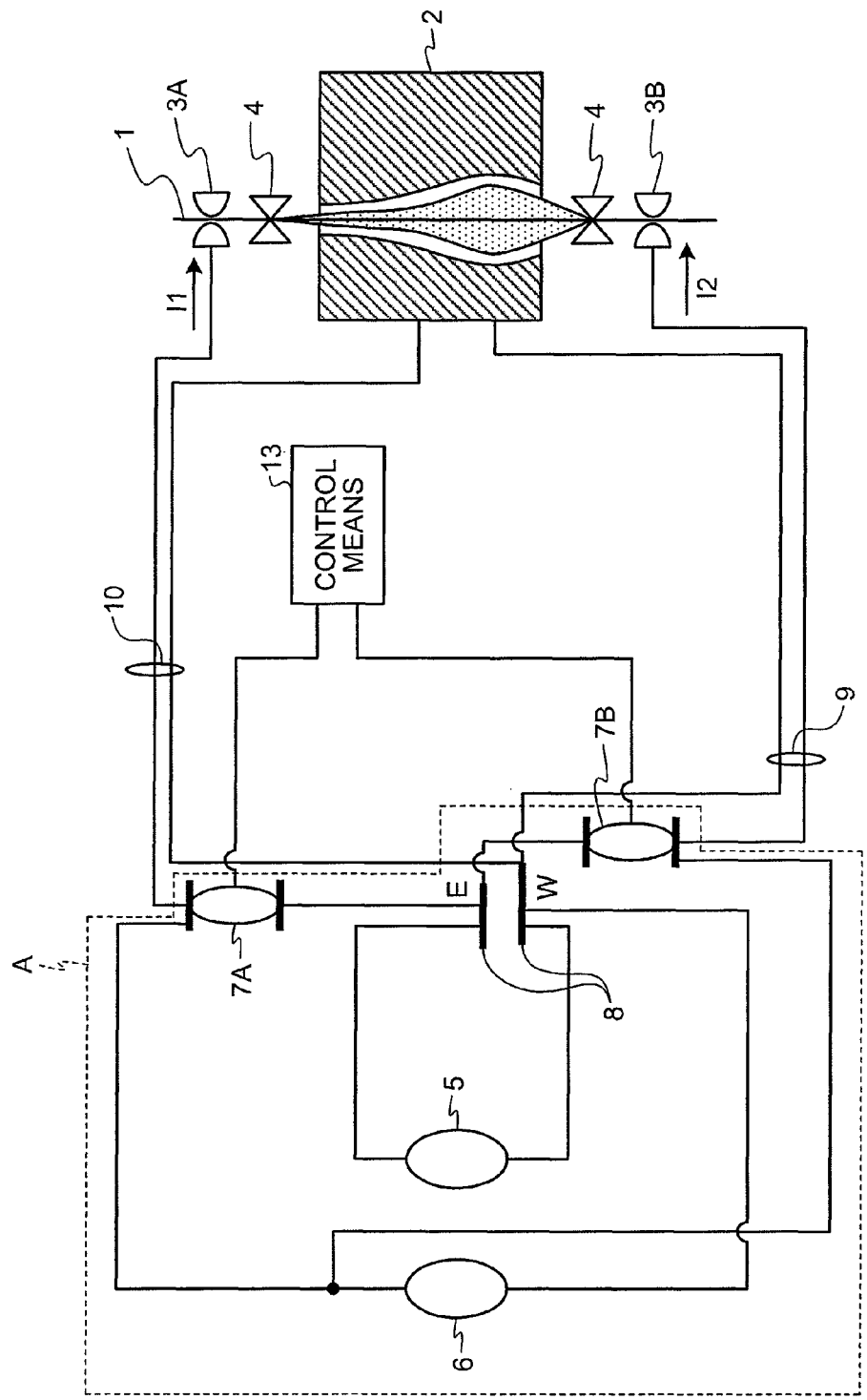
FIG. 1 is a schematic diagram of main elements of a wire electric discharge machine according to a first embodiment of the present invention.

FIG. 1 is a schematic diagram of main elements of a wire electric discharge machine according to a first embodiment of the present invention. The wire electric discharge machine shown in FIG. 1 generates an electric discharge between a wire electrode 1 and a workpiece 2 by application of a voltage thereby machining the workpiece 2. The wire electric discharge machine includes the wire electrode 1, an upper power feed contact (a first power feed contact) 3A, and a lower power feed contact (a second power feed contact) 3B. The wire electrode 1 extends in an up-and-down direction, and moves in the up-and-down direction by being guided by wire guides 4 on the upper and lower sides of the workpiece 2. The upper power feed contact 3A and the lower power feed contact 3B are respectively provided on the upper and lower sides of the workpiece 2. The upper power feed contact 3A and the lower power feed contact 3B respectively feed to the wire electrode 1 by having contact with the wire electrode 1.

The wire electric discharge machine further includes a sub discharge power supply (a sub machining power supply) 6 and a main discharge power supply (a main machining power supply) 5. The sub discharge power supply 6 supplies a discharge current pulse to a machining gap between the wire electrode 1 and the workpiece 2, and applies a relatively low voltage mainly for detecting an interelectrode state. The main discharge power supply 5 outputs a relatively higher voltage than the voltage output by the sub discharge power supply 6, and mainly supplies a machining current to an interelectrode.

The wire electric discharge machine further includes an upper impedance switching circuit (a first impedance switching circuit) 7A and a lower impedance switching circuit (a second impedance switching circuit) 7B. The upper impedance switching circuit 7A is located between the upper power feed contact 3A and the main discharge power supply 5. The upper impedance switching circuit 7A is operative to change an impedance between the upper power feed contact 3A and the main discharge power supply 5. The lower impedance switching circuit 7B is located between the lower power feed contact 3B and the main discharge power supply 5. The lower impedance switching circuit 7B is operative to change an impedance between the lower power feed contact 3B and the main discharge power supply 5.

The sub discharge power supply 6 supplies a discharge current pulse to a machining gap between the wire electrode 1 and the workpiece 2, and applies a low voltage mainly for detecting an interelectrode state. The main discharge power supply 5 outputs a higher voltage than the voltage output by the sub discharge power supply 6, and mainly supplies a machining current to the interelectrode. A terminal block 8 on which output terminals of the main discharge power supply 5 and the sub discharge power supply 6 are formed is provided. One end of the upper impedance switching circuit 7A is connected to the upper power feed contact 3A, and the other end is connected to the terminal block 8. One end of the lower impedance switching circuit 7B is connected to the lower power feed contact 3B, and the other end is connected to the terminal block 8. The impedance switching circuits 7A and 7B, the main discharge power supply 5, and the sub discharge power supply 6 are housed in a power supply box A. The power supply box A is connected to the upper power feed contact 3A, the lower power feed contact 3B, and the workpiece 2 by feeder lines 9 and 10.

The workpiece 2 is generally grounded. For convenience of explanation, one side of the terminal block 8 that is connected to the workpiece 2 is referred to as the W-side, and the other side that is connected to the wire electrode 1 via the power feed contacts 3A and 3B is referred to as the E-side. Because the ground (GND) potential acts as a reference potential, it is preferable that electrical fluctuations in the GND potential are suppressed as much as possible. From this standpoint, the impedance switching circuits 7A and 7B are wired so as to be connected to, but not limited to, the E-side of the terminal block 8.

One of the output terminals of the sub discharge power supply 6 is connected to the upper and lower impedance switching circuits 7A and 7B on the sides of the terminals connected to the power feed contacts 3A and 3B respectively, and the other output terminal is connected to the terminal block 8. Incidentally, the gist of the present invention is, as will be described later, to adjust a flow ratio of upper and lower machining currents. Therefore, when the sub discharge power supply 6 is used for detecting a discharge, for example, in a rough machining process, there is employed such a configuration that a voltage pulse is supplied to the interelectrode without intervention of the upper and lower impedance switching circuits 7A and 7B.

In the present embodiment, a first machining-current loop and a second machining-current loop are formed. The first machining-current loop includes the main discharge power supply 5, the feeder line 10, the upper power feed contact 3A, the wire electrode 1, and the workpiece 2, and lets a machining current (a first machining current) I1 to flow from the upper power feed contact 3A toward the workpiece 2. The second machining-current loop includes the main discharge power supply 5, the feeder line 9, the lower power feed contact 3B, the wire electrode 1, and the workpiece 2, and lets a machining current (a second machining current) I2 to flow from the lower power feed contact 3B toward the workpiece 2.

Furthermore, the wire electric discharge machine still further includes a control means (a control unit) 13. The control means 13 is connected to the upper impedance switching circuit 7A and the lower impedance switching circuit 7B, and controls a flow ratio of the first machining current I1 and the second machining current I2 by changing impedances of the impedance switching circuits 7A and 7B.

In the present embodiment, the impedance switching circuits 7A and 7B are respectively configured as an independent circuit. Alternatively, the impedance switching circuits 7A and 7B can be integrated with the main discharge power supply 5. When integrated with the power supply circuit, there is such an advantage that the controllability of the impedance switching circuit is improved.

Figure 2:
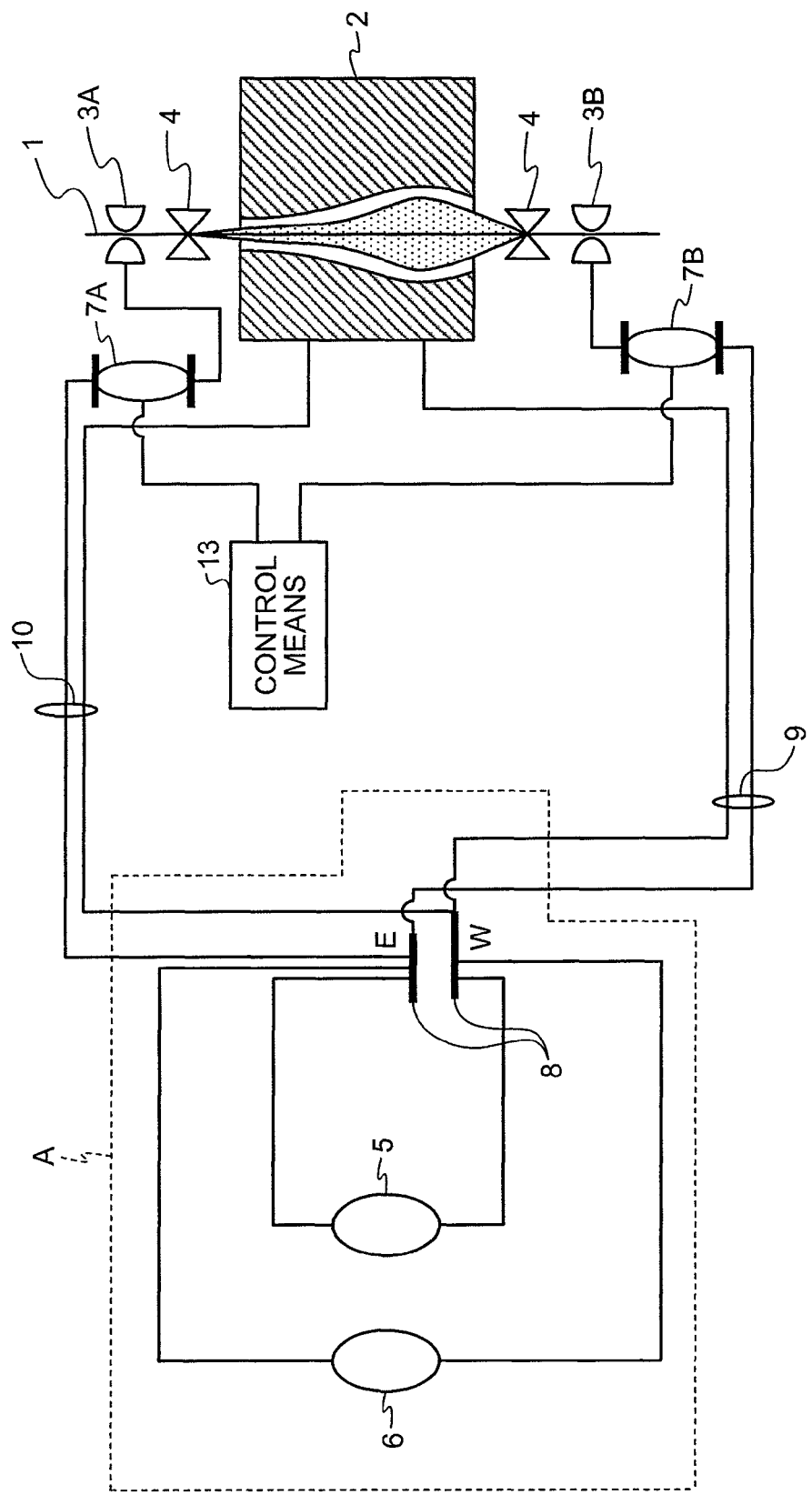
FIG. 2 is a schematic diagram of another configuration example of the main elements of the wire electric discharge machine according to the first embodiment of the present invention.

In the above example, the impedance switching circuits 7A and 7B are housed in the power supply box A. Alternatively, as shown in FIG. 2, the impedance switching circuits 7A and 7B can be arranged near a work tank (near the interelectrode). The wiring of the feeder lines 9 and 10 mostly depends on a physical distance between a power source and the machine, so that there could be a case where the feeder lines 9 and 10 differ in impedance. Even in the case like this, by placing the impedance switching circuits 7A and 7B relatively near the interelectrode, an ultimately-required impedance can be easily adjusted. Incidentally, in an example shown in FIG. 2, the impedance switching circuits 7A and 7B are also inserted in a machining-current loop of the sub discharge power supply 6.

Figures 1, 3:
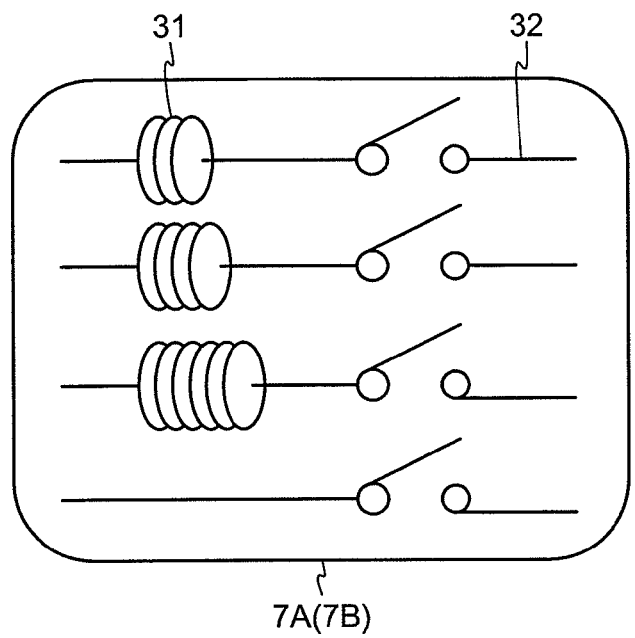
Figures 2, 3:
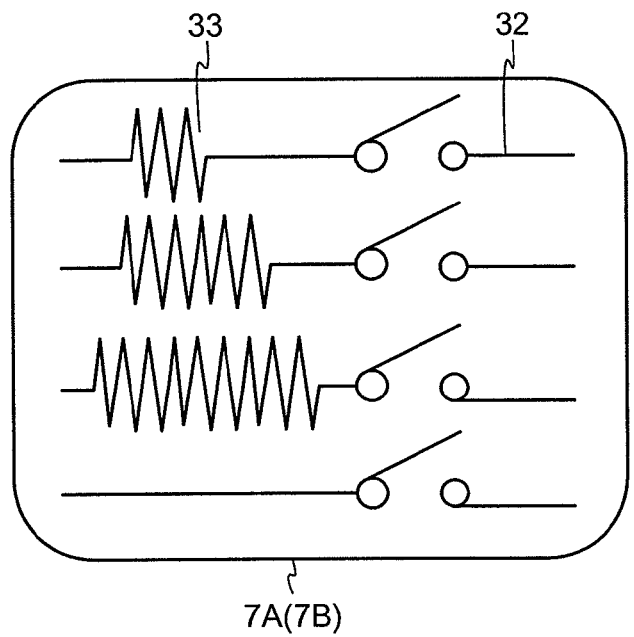

FIGS. 3-1 and 3-2 depict possible configurations of the impedance switching circuits 7A and 7B. The impedance switching circuit 7A or 7B shown in FIG. 3-1 is composed of reactors 31 having different inductance from one another and switching elements (switches) 32. The impedance switching circuit 7A or 7B shown in FIG. 3-2 is composed of resistor elements 33 having a different resistance from one another and the switching elements (the switches) 32. As the switching elements 32, a semiconductor device, such as a field effect transistor (FET), or a mechanical device, such as a relay and a conductor, can be used. Even when the workpiece is machined into a stepped shape that a sheet thickness of the workpiece changes at each step, the flow ratio of the upper and lower machining currents changes in a relatively long machining time (a few seconds to a few minutes). Therefore, it is possible to keep pace with the change in the flow ratio within a response time of the mechanical device sufficiently.

When the impedance switching circuits 7A and 7B are composed of a plurality of the reactors 31 and the switching elements 32 for switching connections to the plurality of the reactors 31, it is possible to design the impedance switching circuits 7A and 7B with a smaller loss. On the other hand, when the impedance switching circuits 7A and 7B are composed of a plurality of the resistor elements 33 and the switching elements 32 for switching connections to the plurality of the resistor elements 33, it is possible to prevent an unnecessary oscillating current.

When the impedance switching circuits 7A and 7B are composed of the reactors 31, a machining energy (a machining current) can be transmitted with a smaller loss. However, an oscillating current easily flows, and a surge voltage may be generated after completion of machining. On the other hand, when the impedance switching circuits 7A and 7B are composed of the resistor elements 33, even when an oscillating current flows, the resistor elements 33 serve to attenuate the oscillating current, so that it is possible to perform machining stably. However, a machining efficiency is decreased (lost) due to heat developed by the resistor elements 33.

Alternatively, the impedance switching circuits 7A and 7B can be composed of cables having a different wire length from one another, a saturable reactor, or the like. In other words, as long as impedances are switched based on a control instruction, the impedance switching circuits 7A and 7B can be composed of various elements or members those having a different impedance from one another or a combination of those elements or members.

As described above, the impedance switching circuits 7A and 7B in the present embodiment are composed of a plurality of impedance elements (the reactors 31 or the resistor elements 33) and the switching elements 32. However, from the standpoint of the gist of the present invention, the impedance switching circuits 7A and 7B need not always be composed of the above elements. As long as a configuration capable of switching impedances is inserted in a machining-current loop path, the impedance switching circuits 7A and 7B can be composed of any elements.

Furthermore, these different impedances are weighted in binary, and the switching elements 32 are driven in parallel, whereby 2n-number of different impedances can be switched by an n-number of components. Such a switching of the impedances is performed by the control means 13. Specifically, for example, the control means 13 can directly monitor information on a machining current and switch the impedance depending on a flow ratio of the machining currents, or can switch the impedance based on factors, for example, preliminarily-stored information, such as information on a sheet thickness, information on a type of wire, and information on a fluid pressure, and a vibrational state of the wire. A machining shape in the through-thickness direction is significantly affected by these factors. The wire electric discharge machine according to the present embodiment can electrically compensate a change in the machining shape caused by such mechanical or physical factors.

For example, when one workpiece is to be cut for a plurality of times, i.e., the workpiece is machined by using the main discharge power supply 5 for a plurality of times for the first cutting, the second cutting, and so on, the impedance can be switched each time the workpiece is cut.

Figure 4:
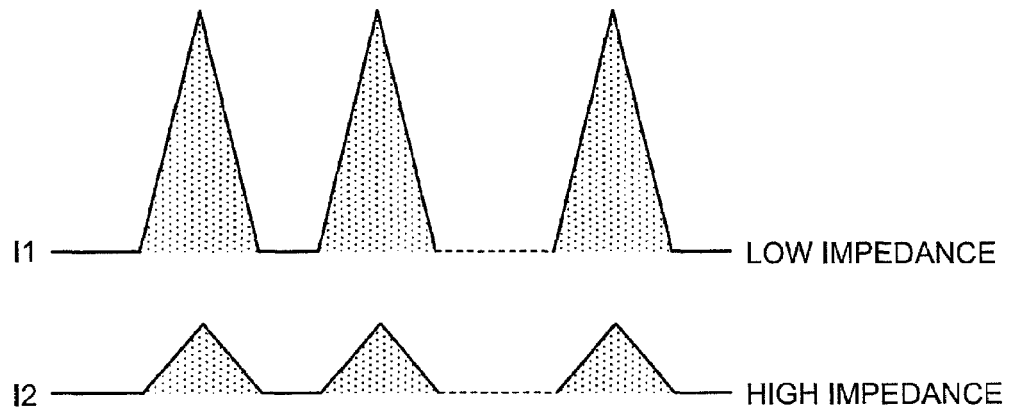
FIG. 4 is a diagram for explaining an example of a machining current flowing through the impedance switching circuit.

FIG. 4 depicts an example of current waveforms of currents supplied via the impedance switching circuit 7A or 7B. The current I1 flows into the interelectrode via the upper power feed contact 3A, and the current I2 flows into the interelectrode via the lower power feed contact 3B. In this example, it is assumed that a low impedance element is selected from a plurality of the impedance elements of the impedance switching circuit 7A, and a high impedance element is selected from a plurality of the impedance elements of the impedance switching circuit 7B. The current I2 does not flow smoothly because of the high impedance, so that a peak value of the current I2 is lower than that of the current I1. When a punching process is performed (hereinafter, there is explained the punching is the machining that the workpiece 2 is processed. In this case, the punching process is a process for punching the workpiece 2 to have a hole shape as a final machining shape in the wire electric discharge machining. If the workpiece 2 is processed too much, the hole shape becomes larger than the desired shape.), the machining shape tends to be small in dimension on the upper side of the workpiece 2 and large in dimension on the lower side of the workpiece 2.

At this time, when it is intended to reduce a dimensional difference on the upper and lower sides, the impedance switching circuits are adjusted so as to meet a condition "I1=I2". Furthermore, the impedance switching circuits correct/compensate the change in impedance that is caused by wiring or structural problems, so that the machining shape in the through-thickness direction (in the up-and-down direction of the workpiece 2) can be stabilized.

Figure 5:
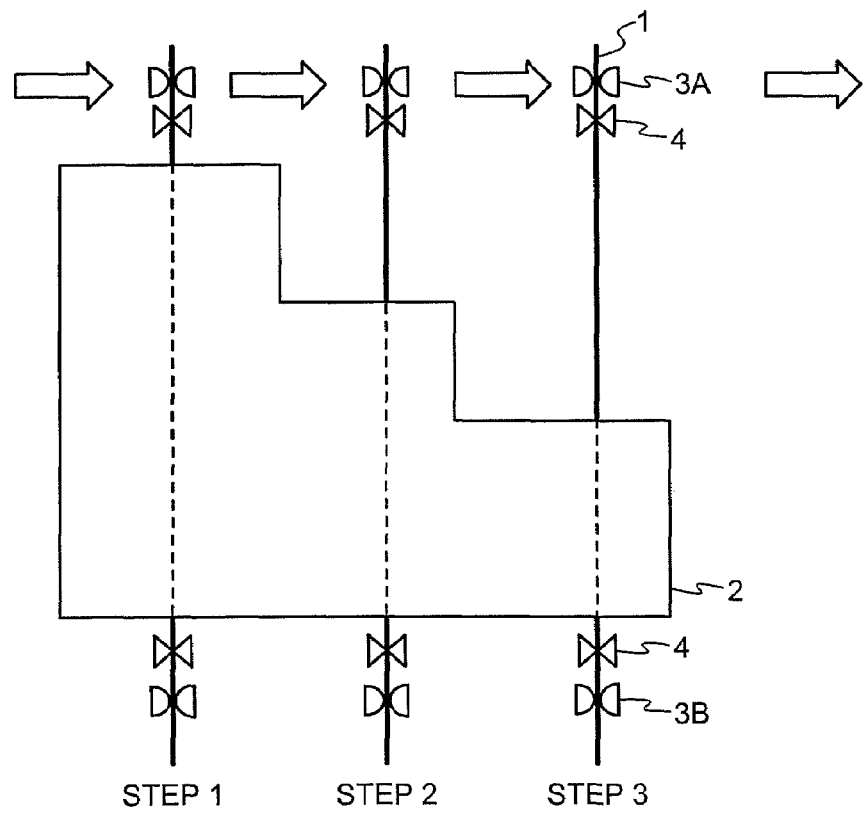
FIG. 5 is a diagram for explaining a machining example of a workpiece machined into a stepped shape.

FIG. 5 is a diagram for explaining a machining example of a workpiece machined into a stepped shape that differs in sheet thickness depending on the machining position. In the example shown in FIG. 5, the workpiece 2 is machined into the stepped shape of three steps 1, 2, and 3 that differ in height in the through-thickness direction. It is assumed that the machining is performed in the order of a portion of the step 1, a portion of the step 2, and a portion of the step 3. If the machining shape has a uniform sheet thickness, the wire electrode 1 can be just moved together with the wire guide 4 and the upper power feed contact 3A while keeping a close distance to the workpiece 2. However, when the machining shape is complex, it is difficult to machine the workpiece 2 with only the mechanical adjustment of components. Therefore, the position of the wire guide 4 is adjusted to a height of the step 1, and there is no choice but to continue the machining for the portions of the steps 2 and 3 while the wire guide 4 is placed at this position. In this case, especially in the machining for the portion of the step 3, the wire impedance increases on the upper side in the through-thickness direction, so that a machining current does not flow smoothly on the upper side, i.e., the machining current on the upper side is low. On the other hand, the wire impedance is low on the lower side in the through-thickness direction because it is located near the power feed contact, so that a machining current easily flows on the lower side. Therefore, even though a machining shape having a uniform sheet thickness in the through-thickness direction can be obtained in the portion of the step 1, as the machining for the portions of the steps 2 and 3 progresses, a machining dimension of the upper side of the workpiece 2 gets larger, and a machining dimension of the lower side of the workpiece 2 gets smaller.

In the wire electric discharge machine shown in FIG. 1, when the machining for the portion of the step 1 is performed, impedances of the impedance switching circuits 7A and 7B are set to be the same impedance. When the machining for the portion of the step 2 is performed, impedances $Z_{7A}$ and $Z_{7B}$ of the impedance switching circuits 7A and 7B are respectively set to meet a condition "$Z_{7A}<Z_{7B}$". When the machining for the portion of the step 3 is performed, impedances $Z_{7A}$ and $Z_{7B}$ of the impedance switching circuits 7A and 7B are respectively set to meet a condition "$Z_{7A}\ll Z_{7B}$". As a result, the upper machining current and the lower machining current at a discharge position (a machining position) are controlled to have substantially the same magnitude, i.e., controlled to meet the condition of "I1=I2". By such a control, even when the workpiece 2 is machined into a machining shape that differs in height in the through-thickness direction, it is possible to obtain the machining shape having a uniform sheet thickness in the through-thickness direction.

Furthermore, when a machining shape in the through-thickness direction is different from a desired shape due to mechanical and physical factors even though a machining shape is not such a stepped shape but a simple flat shape, impedances of the impedance switching circuits 7A and 7B are adjusted to change their directions so as to eliminate the mechanical and physical factors, and then a flow ratio of machining currents is determined.

It will be understood that it is also possible to set the impedance switching circuits 7A and 7B so as to obtain not only a uniform machining shape in the through-thickness direction but also such a desired shape having a large upper machining dimension and a small lower machining dimension (or a small upper machining dimension and a large lower machining dimension). The impedance switching circuits 7A and 7B are used in this manner, whereby a machining shape in the through-thickness direction (the up-and-down direction of the workpiece 2) can be arbitrarily obtained.

Incidentally, in the above first embodiment, only the case of performing the rough machining, i.e., the case where the main discharge power supply 5 is mainly used for the machining. However, the concept of the present embodiment can be applied to the finish machining, i.e., a case where only the sub discharge power supply 6 is used for the machining. In other words, the impedance switching circuits 7A and 7B can be inserted in any one or both of the machining-current loop of the main discharge power supply 5 and the machining-current loop of the sub discharge power supply 6.

Second Embodiment

Figure 6:
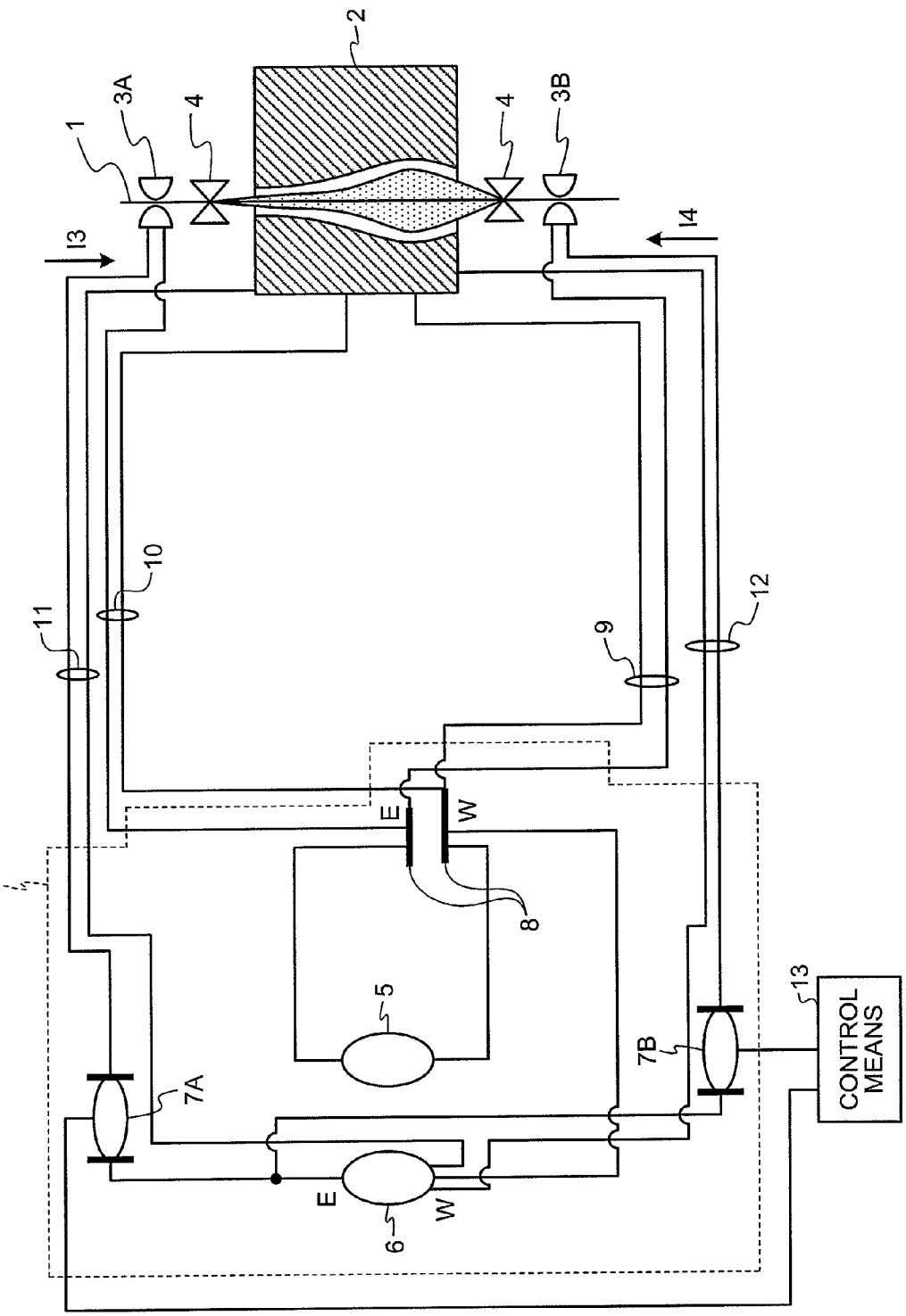
FIG. 6 is a schematic diagram of main elements of a wire electric discharge machine according to a second embodiment of the present invention.

FIG. 6 is a schematic diagram of main elements of a wire electric discharge machine according to a second embodiment of the present invention. In the second embodiment, the impedance switching circuits 7A and 7B are inserted in the machining-current loop of the sub discharge power supply 6. In the present embodiment, a machining shape in the through-thickness direction cannot be controlled in rough machining. Therefore, it may cause a dimensional difference in the through-thickness direction as in the conventional technology. However, in the present embodiment, a dimension error occurred in the rough machining can be corrected in finish machining.

A basic configuration shown in FIG. 6 is almost identical to that for the first embodiment. The sub discharge power supply 6 is configured to be connected to the upper power feed contact 3A and the lower power feed contact 3B via an upper sub-feeder line 11 and a lower sub-feeder line 12 before the interelectrode. Specifically, the E-side of the sub discharge power supply 6 is connected to the impedance switching circuit 7A (or 7B), the upper sub-feeder line 11 (the lower sub-feeder line 12), and the upper power feed contact 3A (or the lower power feed contact 3B) in this order. The W-side of the sub discharge power supply 6 is connected to the upper sub-feeder line 11 (the lower sub-feeder line 12) and the workpiece 2 in this order. The W-side of the sub discharge power supply 6 is also common-connected to the W-side of the main discharge power supply 5. In this case, it is assumed that currents flowing through the upper sub-feeder line 11 and the lower sub-feeder line 12 are respectively denoted by 13 and 14. Incidentally, the impedance switching circuits 7A and 7B can be integrated with the sub discharge power supply 6. When integrated with the power supply circuit, the controllability of the impedance switching circuits can be improved.

In the rough machining, for example, the minimum impedance is selected as impedances of the impedance switching circuits 7A and 7B. In the rough machining, the sub discharge power supply 6 functions only to induce a spark discharge, so that the impedances are not required to be the exact one.

In the finish machining, the main discharge power supply 5 is powered off, so that no machining current is supplied from the main discharge power supply 5. The machining currents I3 and I4 are supplied from the sub discharge power supply 6 to the interelectrode via the impedance switching circuits 7A and 7B. Namely, in the finish machining, the sub discharge power supply 6 serves as a machining power supply.

At this time, the two impedances can be set so as to meet a condition "I3=I4" as explained in the first embodiment, or can be controlled to be corrected in consideration of a machining shape formed in the rough machining or the last machining. For example, if it is obvious that the machining shape is large on the upper side of the workpiece 2 and small on the lower side of the workpiece 2 after completion of the last machining, impedances $Z_{7A}$ and $Z_{7B}$ are set to meet a condition "$Z_{7A} \gg Z_{7B}$" so that the machining shape on the lower side gets larger in the next machining. After completion of the finish machining as the next machining, the uniform machining shape in the through-thickness direction can be obtained.

Third Embodiment

Figure 7:
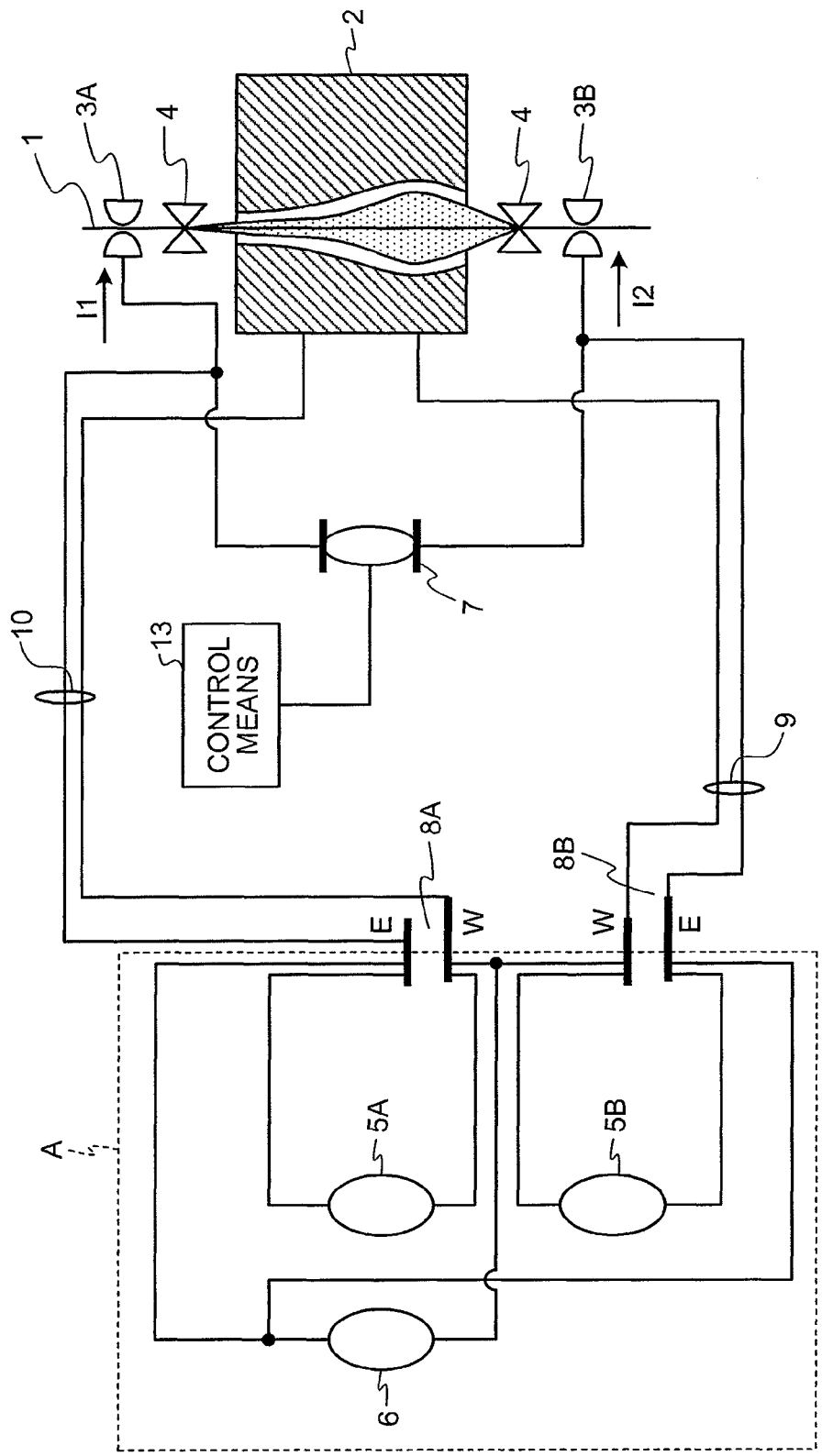
FIG. 7 is a schematic diagram of main elements of a wire electric discharge machine according to a third embodiment of the present invention.
Figure 8:
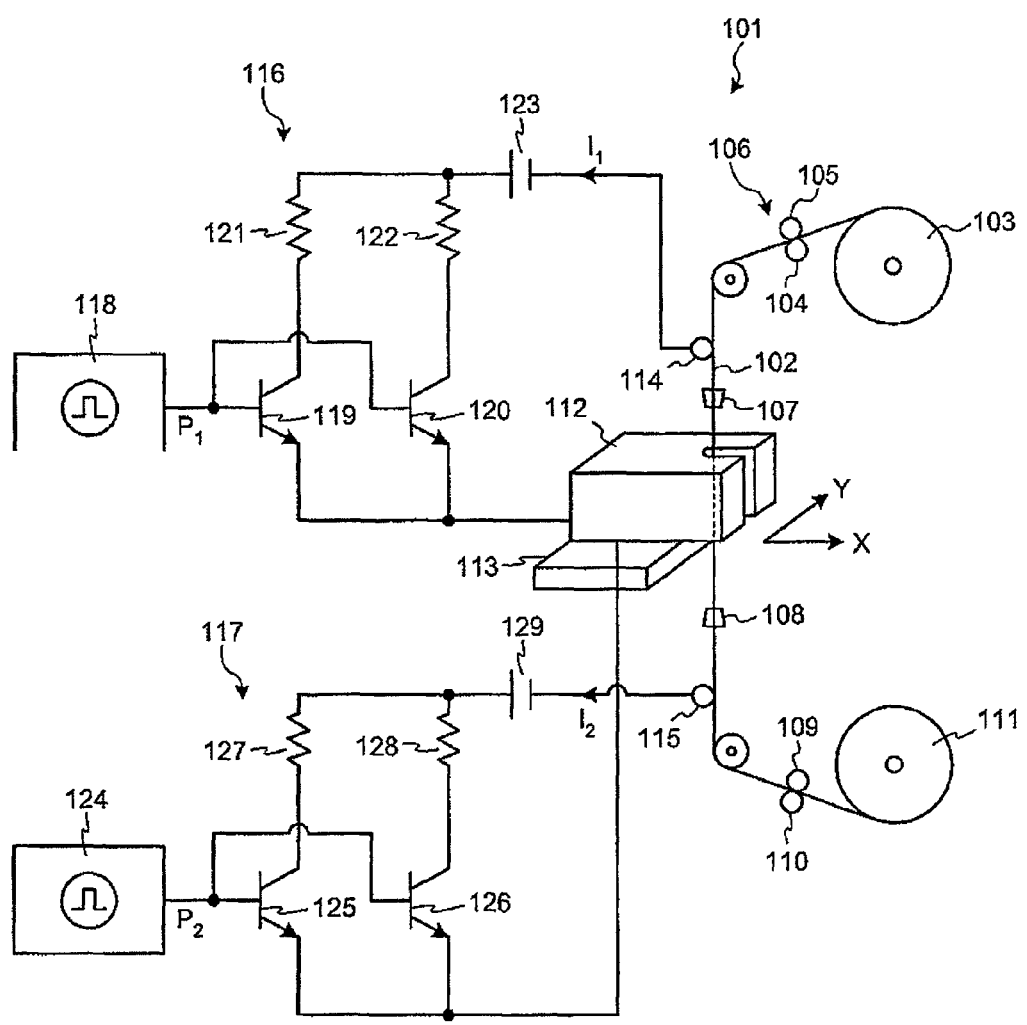
FIG. 8 is a schematic diagram of main elements of a conventional wire electric discharge machine, for example, disclosed in Patent document 1.

FIG. 7 is a schematic diagram of main elements of a wire electric discharge machine according to a third embodiment of the present invention. In the first embodiment, there is provided one number of the main discharge power supply 5. In the present embodiment, there are provided two main discharge power supplies, i.e., a main discharge power supply (a first machining power supply) 5A connecting to the upper power feed contact 3A and a main discharge power supply (a second machining power supply) 5B connecting to the lower power feed contact 3B. Output terminals of the main discharge power supplies 5A and 5B are denoted by 8A and 8B, respectively. The W-side of the output terminal 8A is connected to the W-side of the output terminal 8B. The sub discharge power supply 6 is connected in parallel to each of the main discharge power supplies 5A and 5B. The output terminal 8A is connected to the upper power feed contact 3A via the feeder line 10, and the output terminal 8B is connected to the lower power feed contact 3B via the feeder line 9. The upper power feed contact 3A and the lower power feed contact 3B are connected to each other via an impedance switching circuit 7. The impedance switching circuit 7 is identical to the impedance switching circuits 7A and 7B in the first embodiment.

The main discharge power supplies 5A and 5B can be driven independently. The main discharge power supplies 5A and 5B can be configured to supply a machining current either in synchronization or in out-of-synchronization with each other. First, an example where only the main discharge power supply (the first machining power supply) 5A is used for machining is explained below.

In synchronization with detection of a spark discharge generated by the application of subpulse from the sub discharge power supply 6, the main discharge power supply 5A supplies a machining current to the interelectrode. The machining current is supplied from the main discharge power supply 5A to the upper power feed contact 3A via the feeder line 10 on a relatively low impedance path (a first machining-current loop). On the other hand, the main discharge power supply 5B is powered off, so that the lower power feed contact 3B is not supplied with a current directly from the machining power supply. The lower power feed contact 3B is supplied with a machining current in a loop (a second machining-current loop) of the main discharge power supply 5A, the feeder line 10, the upper power feed contact 3A, the impedance switching circuit 7, and the lower power feed contact 3B.

Namely, a high impedance is imposed on the lower power feed contact 3B because of intervention of the impedance switching circuit 7, so that a peak current of the machining current flowing to the lower power feed contact 3B is low. At this time, it can be considered that a relation between the machining current I1 flowing to the upper power feed contact 3A and the machining current I2 flowing to the lower power feed contact 3B is equivalent to that is shown in FIG. 4. Therefore, as explained in the first embodiment, a machining shape tends to be small in dimension on the upper side of the workpiece 2 and large in dimension on the lower side of the workpiece 2.

On the contrary, when the machining current I1 is controlled to be small and the machining current I2 is controlled to be large, only the main discharge power supply 5B is used for machining, and the main discharge power supply 5A is powered off. As a result, the machining current I1 flows in a loop of the main discharge power supply 5B, the feeder line 9, the lower power feed contact 3B, the impedance switching circuit 7, and the upper power feed contact 3A, so that the machining current I1 becomes smaller than the machining current I2.

Subsequently, an example where the main discharge power supply (the second machining power supply) 5B is used for machining is explained below. In synchronization with detection of a spark discharge generated by the application of subpulse from the sub discharge power supply 6, the main discharge power supply 5B supplies a machining current to the interelectrode. The machining current is supplied from the main discharge power supply 5B to the lower power feed contact 3B via the feeder line 9 on a relatively low impedance path (a third machining-current loop). On the other hand, the main discharge power supply 5A is powered off, so that the upper power feed contact 3A is not supplied with a current directly from the machining power supply. The upper power feed contact 3A is supplied with a machining current in a loop (a fourth machining-current loop) of the main discharge power supply 5B, the feeder line 9, the lower power feed contact 3B, the impedance switching circuit 7, and the upper power feed contact 3A.

In this manner, in the present embodiment, the impedance switching circuit 7 is shared by the second machining-current loop and the fourth machining-current loop. As a matter of course, the impedance switching circuit 7 can be shared by the third machining-current loop and the first machining-current loop.

To respond to various machining shapes, in the present embodiment, there are provided two number of the main discharge power supplies 5A and 5B as the main machining power supply. However, the present invention is not limited to this configuration. Alternatively, any one of the main machining power supplies can be removed depending on machining characteristics so that one of the power feed contacts is supplied with a machining current directly from the main machining power supply and the other is supplied with a machining current via the impedance switching circuit 7.

An impedance of the impedance switching circuit 7 is controlled depending on a machining state, whereby a machining shape in the through-thickness direction (the up-and-down direction of the workpiece 2) can be stabilized in the same manner as in the first embodiment. In other words, a machining shape in the through-thickness direction (the up-and-down direction of the workpiece 2) can be arbitrarily obtained by changing an impedance of the impedance switching circuit 7.

INDUSTRIAL APPLICABILITY

The invention is suitable for use in an apparatus that machines a workpiece by use of an arc discharge generated between a wire electrode and the workpiece, and is particularly most suitable for a case where a portion of a workpiece along a wire electrode is wire-cut into an arbitrary machining shape.

The invention claimed is:

1. A wire electric discharge machine that generates an electric discharge between a wire electrode and a workpiece by application of a voltage thereby machining the workpiece, the wire electric discharge machine comprising:
    the wire electrode which moves with respect to the workpiece;
    a machining power supply which supplies a machining current between the wire electrode and the workpiece;
    a power feed contact comprising a first power feed contact and a second power feed contact that respectively feed power by contacting the wire electrode at at least two points, said points are on lower and upper sides of the workpiece which is positioned between the at least two points;
    a first machining-current loop comprising the machining power supply, the first power feed contact, the wire electrode, and the workpiece, where in the first machining-current loop, a first machining current of the machining current flows from the first power feed contact toward the workpiece;
    a second machining-current loop comprising the machining power supply, the second power feed contact, the wire electrode, and the workpiece, and where in the second machining-current loop, a second machining current of the machining current flows from the second power feed contact toward the workpiece;
    an impedance switching circuit positioned in one of the first machining-current loop and the second machining-current loop, where the impedance switching circuit has a variable impedance; and
    a control unit which controls a flow ratio of the first machining current and the second machining current by changing the impedance of the impedance switching circuit
    the control unit controls such that
        the first machining current is substantially equal to the second machining current when making a difference between a machining dimension on a side of the first power feed contact and a machining dimension on a side of the second power feed contact small,
        the first machining current is smaller than the second machining current when making the machining dimension on the side of the first power feed contact greater than the machining dimension on the side of the second power feed contact, and
        the first machining current is greater than the second machining current when making the machining dimension on the side of the first power feed contact smaller than the machining dimension on the side of the second power feed contact.

2. The wire electric discharge machine according to claim 1, wherein
    the impedance switching circuit includes a first impedance switching circuit and a second impedance switching circuit,
    the first impedance switching circuit is provided between the first power feed contact and the machining power supply in the first machining-current loop,
    the second impedance switching circuit is provided between the second power feed contact and the machining power supply in the second machining-current loop, and
    the control unit controls the flow ratio of the first machining current and the second working current by changing impedances of the first impedance switching circuit and the second impedance switching circuit.

3. The wire electric discharge machine according to claim 1, wherein the impedance switching circuit is arranged between the power feed contact and the machining power supply.

4. The wire electric discharge machine according to claim 1, wherein the impedance switching circuit comprises:
    a plurality of reactors; and
    a switch which connections to the plurality of reactors.

5. The wire electric discharge machine according to claim 1, wherein the impedance switching circuit comprises
    a plurality of resistor elements; and
    a switch which switches connections to the plurality of resistor elements.

6. The wire electric discharge machine according to claim 1, wherein the machining power supply comprises:
    a sub machining power supply which applies a low voltage between the wire electrode and the workpiece supplying a discharge current pulse for detecting an interelectrode state; and
    a main machining power supply which applies a voltage higher than the low voltage between the wire electrode and the workpiece supplying the machining current,
    wherein any of the sub machining power supply and the main machining power supply is selectively used as the machining power supply.

7. The wire electric discharge machine according to claim 6, further comprising a terminal block on which output terminals of the main power supply and the sub machining power supply are formed, wherein the impedance switching circuit, the main power supply and the sub machining power supply are housed in a power supply box, and wherein the power supply box is connected to the first and second power feed contacts via respective feeder lines.

8. The wire electric discharge machine according to claim 1, wherein the control unit controls the impedance based on at least any one of a magnitude of the machining current, a shape of the workpiece, a type of the wire electrode, a type of a machining fluid, and a vibrational state of the wire electrode.

9. The wire electric discharge machine according to claim 1, wherein the impedance switching circuit is integrated with the machining power supply.

10. The wire electric discharge machine according to claim 1, wherein the impedance switching circuit is arranged near the power feed contact.

11. The wire electric discharge machine according to claim 1, wherein the impedance switching circuit comprises a first impedance switching circuit and a second impedance switching circuit, wherein the first impedance switching circuit and the second impedance switching circuit are independent and the control unit controls each of the first impedance switching circuit and the second impedance switching circuit to provide variable impedance that is greater than zero.

12. The wire electric discharge machine according to claim 1, wherein the control unit varies impedance of the impedance switching circuit based on stepped shape into which the workpiece is machined and wherein the impedance switching circuit comprises one of a plurality of reactors with different inductance from one another and a plurality of resistors with different resistance from one another.

13. A wire electric discharge machine that generates an electric discharge between a wire electrode and a workpiece by application of a voltage thereby machining the workpiece, the wire electric discharge machine comprising:

a wire electrode which moves with respect to the workpiece;

a machining power supply comprising a first machining power supply and a second machining power supply that respectively supply a machining current between the wire electrode and the workpiece;

a power feed contact comprising a first power feed contact and a second power feed contact that respectively feed power by contacting the wire electrode at at least two points, said points are on lower and upper sides of the workpiece which is positioned between the at least two points;

a first machining-current loop comprising the first machining power supply, the first power feed contact, the wire electrode, and the workpiece, where in the first machining-current loop, a first machining current of the machining current flows from the first power feed contact toward the workpiece;

a second machining-current loop comprising the first machining power supply, the second power feed contact, the wire electrode, and the workpiece, where in the second machining-current loop, a second machining current of the machining current flows from the second power feed contact toward the workpiece;

a third machining-current loop comprising the second machining power supply, the first power feed contact, the wire electrode, workpiece, where in the third machining-current loop, a third machining current of the machining current flows from the first power feed contact toward the workpiece;

a fourth machining-current loop comprising the second machining power supply, the second power feed contact, the wire electrode, and the workpiece, where in the fourth machining-current loop, a fourth machining current of the machining current flows from the second power feed contact toward the workpiece;

an impedance switching circuit positioned in one of the first machining-current loop and the second machining-current loop, and at least any one of the third machining-current loop and the fourth machining-current loop so as to be shared among at least two machining-current loops, where the impedance switching circuit has a variable impedance; and a control unit which controls a first flow ratio of the first machining current and the second machining current and a second flow ratio of the third machining current and the fourth machining current by changing the impedance of the impedance switching circuit wherein the control unit controls such that:
the first machining current is substantially equal to the second machining current when making a difference between a machining dimension on a side of the first power feed contact and a machining dimension on a side of the second power feed contact small,
the first machining current is smaller than the second machining current when making the machining dimension on the side of the first power feed contact greater than the machining dimension on the side of the second power feed contact, and
the first machining current is greater than the second machining current when making the machining dimension on the side of the first power feed contact smaller than the machining dimension on the side of the second power feed contact.

14. The wire electric discharge machine according to claim 13, wherein the impedance switching circuit is arranged between the power feed contact and the machining power supply.

15. The wire electric discharge machine according to claim 13, wherein the impedance switching circuit comprises:
a plurality of reactors; and
a switch which switches connections to the plurality of reactors.

16. The wire electric discharge machine according to claim 13, wherein the impedance switching circuit comprises:
a plurality of resistor elements; and
a switch which switches connections to the plurality of resistor elements.

17. The wire electric discharge machine according to claim 13, wherein the machining power supply comprises:
a sub machining power supply which applies a low voltage between the wire electrode and the workpiece supplying a discharge current pulse for detecting an interelectrode state; and
a main machining power supply which applies a voltage higher than the low voltage between the wire electrode and the workpiece supplying the machining current,
wherein any of the sub machining power supply and the main machining power supply is selectively used as the machining power supply.

18. The wire electric discharge machine according to claim 13, wherein the control unit controls the impedance based on at least any one of a magnitude of the machining current, a shape of the workpiece, a type of the wire electrode, a type of a machining fluid, and a vibrational state of the wire electrode.

19. The wire electric discharge machine according to claim 13, wherein the impedance switching circuit is integrated with the machining power supply.

20. The wire electric discharge machine according to claim 13, wherein the impedance switching circuit is arranged near the power feed contact.

21. A power supply device for a wire electric discharge machine that generates an electric discharge between a wire electrode and a workpiece by application of a voltage thereby machining the workpiece, the power supply device comprising:
a machine power supply which supplies, between the wire electrode and the workpiece, a first machining current and a second machining current through a first power feed contact and a second power feed contact that respectively feed power by contacting the wire electrode at least two points, said two points are on upper and lower sides of the workpiece which is positioned between the at least two points;
an impedance switching circuit which has a variable impedance; and
a control unit which controls a flow ratio of the first machining current and the second machining current by changing the impedance of the impedance switching circuit,
wherein the control unit controls such that:
the first machining current is substantially equal to the second machining current when making a difference between a machining dimension on a side of the first power feed contact and a machining dimension on a side of the second power feed contact small,
the first machining current is smaller than the second machining current when making the machining dimension on the side of the first power feed contact greater than the machining dimension on the side of the second power feed contact, and the first machining current is greater than the second machining current when making the machining dimension on the side of the first power feed contact smaller than the machining dimension on the side of the second power feed contact.

\* \* \* \* \*